(12) United States Patent
Andrews

(10) Patent No.: US 8,888,105 B1
(45) Date of Patent: Nov. 18, 2014

(54) MECHANICAL SEAL SYSTEM

(71) Applicant: Stephen J. Andrews, Hackettstown, NJ (US)

(72) Inventor: Stephen J. Andrews, Hackettstown, NJ (US)

( * ) Notice: Subject to any disclaimer, the term of this patent is extended or adjusted under 35 U.S.C. 154(b) by 69 days.

(21) Appl. No.: 13/904,655

(22) Filed: May 29, 2013

(51) Int. Cl.
*F16J 15/34* (2006.01)
*F16J 15/18* (2006.01)

(52) U.S. Cl.
CPC ...................... *F16J 15/18* (2013.01)
USPC ............................ 277/371; 277/358; 277/365

(58) Field of Classification Search
USPC .......... 277/358, 361, 365, 370, 371, 389, 401
See application file for complete search history.

(56) References Cited

U.S. PATENT DOCUMENTS

| | | |
|---|---|---|
| 3,360,272 A | 12/1967 | Blom et al. |
| 4,290,611 A | 9/1981 | Sedy |
| 4,406,465 A | 9/1983 | Rockwood et al. |
| 4,439,096 A | 3/1984 | Rockwood et al. |
| 4,501,530 A | 2/1985 | Rockwood et al. |
| 4,884,945 A | 12/1989 | Boutin et al. |
| 5,071,139 A | 12/1991 | Warner |
| 5,071,141 A | 12/1991 | Lai et al. |
| 5,129,482 A | 7/1992 | Warner et al. |
| 5,201,531 A | 4/1993 | Lai |
| 5,217,233 A | 6/1993 | Pecht et al. |
| RE34,319 E | 7/1993 | Boutin et al. |
| 5,249,812 A | 10/1993 | Volden et al. |
| 5,263,404 A | 11/1993 | Gaucher et al. |
| 5,344,291 A | 9/1994 | Antkowiak |
| 5,372,730 A | 12/1994 | Warner et al. |
| 5,375,853 A | 12/1994 | Wasser et al. |
| 5,398,944 A | 3/1995 | D'Alfonso et al. |
| 5,454,572 A | 10/1995 | Pospisil |
| 5,456,286 A | 10/1995 | Warner et al. |
| 5,468,002 A | 11/1995 | Wasser |
| 5,489,105 A | 2/1996 | Attenasio et al. |
| 5,529,315 A | 6/1996 | Borrino et al. |
| 5,544,897 A | 8/1996 | Di Pietro et al. |
| 5,636,847 A | 6/1997 | Ostrowski |
| 5,681,047 A | 10/1997 | Klosterman et al. |
| 5,713,576 A | 2/1998 | Wasser et al. |
| 5,827,042 A | 10/1998 | Ramsay |
| 5,901,965 A | 5/1999 | Ringer et al. |
| 5,927,722 A | 7/1999 | Carmody et al. |
| 5,938,206 A | 8/1999 | Klosterman et al. |
| 5,984,627 A | 11/1999 | Ramsay |
| 6,076,830 A | 6/2000 | Wu et al. |
| 6,142,478 A | 11/2000 | Pecht et al. |
| 6,155,572 A | 12/2000 | Wu et al. |
| 6,182,971 B1 | 2/2001 | Parker et al. |
| 6,196,813 B1 | 3/2001 | Turley et al. |
| 6,203,294 B1 | 3/2001 | Turley et al. |
| 6,210,103 B1 | 4/2001 | Ramsay |
| 6,210,107 B1 | 4/2001 | Volden et al. |

(Continued)

FOREIGN PATENT DOCUMENTS

| WO | WO9001118 | 2/1990 |
|---|---|---|
| WO | WO9512081 | 4/1995 |

(Continued)

*Primary Examiner* — Gilbert Lee
(74) *Attorney, Agent, or Firm* — Brendan Mee

(57) ABSTRACT

A mechanical seal system for a pump or other rotary shaft equipment has three, four, five or more mechanical seals installed in and about the seal chamber, replacing and improving upon the conventional or cartridge, single, double, dual or tandem mechanical seal arrangements. In embodiments, a plurality of barrier liquids and/or barrier gases are provided separately to the seal faces.

20 Claims, 4 Drawing Sheets

(56) References Cited

U.S. PATENT DOCUMENTS

| | | |
|---|---|---|
| 6,224,060 B1 | 5/2001 | Parker et al. |
| 6,280,157 B1 | 8/2001 | Cooper |
| 6,345,954 B1 | 2/2002 | Al-Himyary et al. |
| 6,386,547 B2 | 5/2002 | Wu et al. |
| 6,398,223 B1 | 6/2002 | Radosav |
| 6,428,011 B1 | 8/2002 | Oskouei |
| 6,457,950 B1 | 10/2002 | Cooper et al. |
| 6,655,693 B2 | 12/2003 | Hosanna et al. |
| 6,685,191 B2 | 2/2004 | Toal |
| 7,097,351 B2 | 8/2006 | Lancon et al. |
| 7,300,060 B2 | 11/2007 | Zagres |
| 7,377,518 B2 | 5/2008 | Lai |
| 7,438,519 B2 | 10/2008 | Torres-Reyes |
| 7,854,629 B1 | 12/2010 | Albers et al. |
| 7,905,496 B2 | 3/2011 | Roddis |
| 8,029,317 B2 | 10/2011 | Albers et al. |
| 8,056,902 B2 | 11/2011 | Roddis et al. |
| 2005/0177804 A1 | 8/2005 | Wilkinson |
| 2011/0123374 A1 | 5/2011 | Albers et al. |
| 2012/0237150 A1 | 9/2012 | Griggs |
| 2012/0251293 A1 | 10/2012 | Andrews |
| 2013/0011256 A1 | 1/2013 | Holzapfel et al. |
| 2013/0022460 A1 | 1/2013 | Monnot |

FOREIGN PATENT DOCUMENTS

| | | |
|---|---|---|
| WO | WO9931413 | 6/1999 |
| WO | WO0102734 | 1/2001 |
| WO | WO03079185 | 9/2003 |
| WO | WO2006005950 | 1/2006 |
| WO | WO2006070205 | 7/2006 |
| WO | WO2009156729 | 12/2009 |
| WO | WO2011062797 | 5/2011 |
| WO | WO2011085762 | 7/2011 |
| WO | WO2011090826 | 7/2011 |
| WO | WO2011133656 | 10/2011 |
| WO | WO2010068297 | 1/2012 |
| WO | WO2012079765 | 6/2012 |
| WO | WO2012135610 | 10/2012 |

MECHANICAL SEAL SYSTEM

BACKGROUND OF THE INVENTION

1. Field of the Invention

The invention is in the field of mechanical seal technology. In particular, the invention is directed to a mechanical seal system having three, four or five mechanical seals adapted to be used with rotating shaft equipment to prevent leakage.

2. Description of the Related Art

Mechanical seals are widely used to prevent leakage in rotary shaft equipment, such as pumps, mixers, agitators, and compressors, in which a rotating shaft passes through an opening in the housing of the equipment. This type of equipment is characterized by a housing in which process fluid is maintained at pressure and therefore prone to leakage where the shaft enters the housing. The mechanical seals are housed in a seal chamber bolted to the face of the pump housing.

A mechanical seal is characterized by a rotating sealing face, a stationary sealing face and a loading mechanism such as a spring, coil or bellows maintaining the sealing faces compressed against each other. The sealing faces are machined smooth—such that surface roughness often may not exceed 2 millionths of an inch. Mechanical seal manufacturers often provide installation parameters which specify the position where an individual seal on the shaft or shaft sleeve must be installed to maintain the proper spring loading tension and proper force on the delicate sealing faces to prevent leakage. The seal system is also provided with secondary seals, such as O-rings, gaskets, wedges, sealing rings and the like compressed around the primary sealing faces to close off secondary leakage paths around the sealing faces.

The mechanical seal systems in use today are single seal and dual seal systems. A dual seal system typically includes two seal assemblies mounted on a shaft with a barrier fluid filling a space between them. Thus, the upstream (most inboard) seal is situated between the process fluid and the barrier fluid. And the downstream seal (most outboard) is between the barrier fluid and the atmosphere. The barrier fluid is maintained at a higher pressure so as to maintain a positive flow of clean barrier fluid across the downstream seal faces, while the upstream seal is lubricated by both the barrier fluid and the process fluid. The barrier fluid is used where the process fluid is corrosive or abrasive and likely to damage the sealing faces over time. Examples of dual seal systems are disclosed in U.S. Pat. No. 4,290,611 to Sedy, which is incorporated by reference in its entirety.

Another type of barrier system is a gas barrier. In these systems, a suitable gas (such as nitrogen) under pressure is used to prevent seepage of process fluid through the mechanical seal to the atmosphere. It is known in the gas barrier systems to provide a sealing face with spiral grooves, such that as an inert barrier gas is provided between the seals, and as the shaft rotates, gas flows into the grooves and creates an opening force between the sealing faces. This force causes the sealing faces to separate a few thousandths of an inch. As a result of reduced or eliminated contact between the sealing faces, wear is reduced and the need to cool the sealing faces is largely eliminated while maintaining the same or better leakage prevention as a "wet barrier seal." Gas flow to the seal faces is regulated with a gas panel—the barrier gas circulates through the system at a measured pressure and flow rate and ultimately is vented to the process or atmosphere. A gas barrier system having a sealing face with a spiral groove is disclosed in U.S. Pat. No. 5,375,853 to Wasser, et al., which is incorporated by reference for this purpose.

Staged seal assemblies for extreme duty applications are also known, such as described in U.S. Pat. Nos. 3,360,272 to Blom and 7,300,060 to Zagres, which are incorporated by reference. These assemblies are characterized by having a plurality of staged seals disposed in series along a shaft, each provided with a seal bypass. The seal bypass is configured to direct a portion of fluid through a pressure breakdown device around the respective seal. This diversion of process fluid reduces the severity of the duty requirement on each seal.

U.S. Pat. No. 5,901,965 to Ringer et al. is incorporated by reference for its description of bellows and seal ring construction, which is known in the art. The Ringer et al. patent discloses an improvement on a conventional bellows seal, including a stationary seal ring fitted against a stationary seal ring shell and a bellows attached to the side of the seal ring shell opposite the seal ring, in which undesired stresses on the seal ring and seal ring shell are avoided by decoupling the seal ring and the seal ring shell and using a seal element between the seal ring shell and the seal ring to balance load.

One object of the invention is to increase the service life of a mechanical seal system and reduce or eliminate leakage of process or barrier fluid from the equipment housing.

A further object of the invention is to provide a mechanical seal system with three or more mechanical seals that fits existing standard pumps, mixers and other rotating shaft equipment without modification.

A further object of the invention is to provide a mechanical seal system with three, four, five or more mechanical seals which is not a pressure staging system and which does not include a pressure reducing flow path between upstream and downstream seals.

A further object of the invention is to provide a mechanical seal system with extended operational life using individual seals having relatively low pressure rating to accommodate the application.

A further object of the invention is to provide a mechanical seal system having a plurality of barrier fluid sources each providing the same or different barrier fluid to a plurality of seal faces via different fluid pathways. In embodiments, a gas barrier may be used in combination with a liquid barrier fluid.

SUMMARY OF THE INVENTION

In one aspect, the invention is a three-seal mechanical seal system for containing a fluid in rotary shaft equipment. The mechanical seal system comprises three seals, two inboard of the seal gland and one outboard. The inboard seals comprise: (1) a first rotating seal face, a first stationary seal face, and a first biasing member urging the first rotating seal face toward the first stationary seal face; and (2) a second rotating seal face downstream of the first rotating seal face, a second stationary seal face, and a second biasing member urging the second rotating seal face toward the second stationary seal face. A seal chamber surrounds the rotating shaft and has an opening at an upstream end thereof where the rotating shaft enters the stationary housing. An axial end wall of the seal chamber is formed by the seal gland, which has an opening for the rotating shaft at the downstream end. The outboard seal comprises (3) a third rotating seal face downstream of the first and second rotating seal faces, a third stationary seal face, and a third biasing member urging the third rotating seal face toward the third stationary seal face. The third rotating seal face, third stationary seal face, and third biasing member are located outboard of and integrated with the seal gland.

In another aspect, the invention is a four seal mechanical seal system which includes all of the seals in the three-seal system and further includes an additional upstream seal comprising a fourth rotating seal face, a fourth stationary seal face and a fourth biasing member urging the fourth rotating seal face toward the fourth stationary seal face.

The invention also contemplates a five-seal mechanical seal system which includes all of the seals in the four-seal system and further includes an additional upstream seal comprising a fifth rotating seal face, a fifth stationary seal face and a fifth biasing member urging the fifth rotating seal face toward the fifth stationary seal face.

In a further aspect of the invention, the three, four or five-seal mechanical seal system according to the invention, may be provided as a cartridge in which the first, second and third rotating and stationary seal faces are pre-mounted on a sleeve, which is attached to the shaft with a drive collar and set screw. The sleeve is attached to the seal gland so that the sleeve is installed over the shaft and the seal gland is attached to the seal chamber with the first, second and third stationary seal faces and associated rotating seal faces and biasing members being positioned in predetermined axial spacing on the shaft upon installation.

In a further aspect of the invention, a plurality of barrier fluid sources (i.e., at least two separate barrier fluids) are provided separately to the mechanical seal faces, and may comprise a combination of gas barrier and liquid barrier fluid. As used herein, the term "barrier fluid" encompasses both a liquid barrier fluid and a gas barrier.

DETAILED DESCRIPTION OF THE INVENTION

Figure 1:
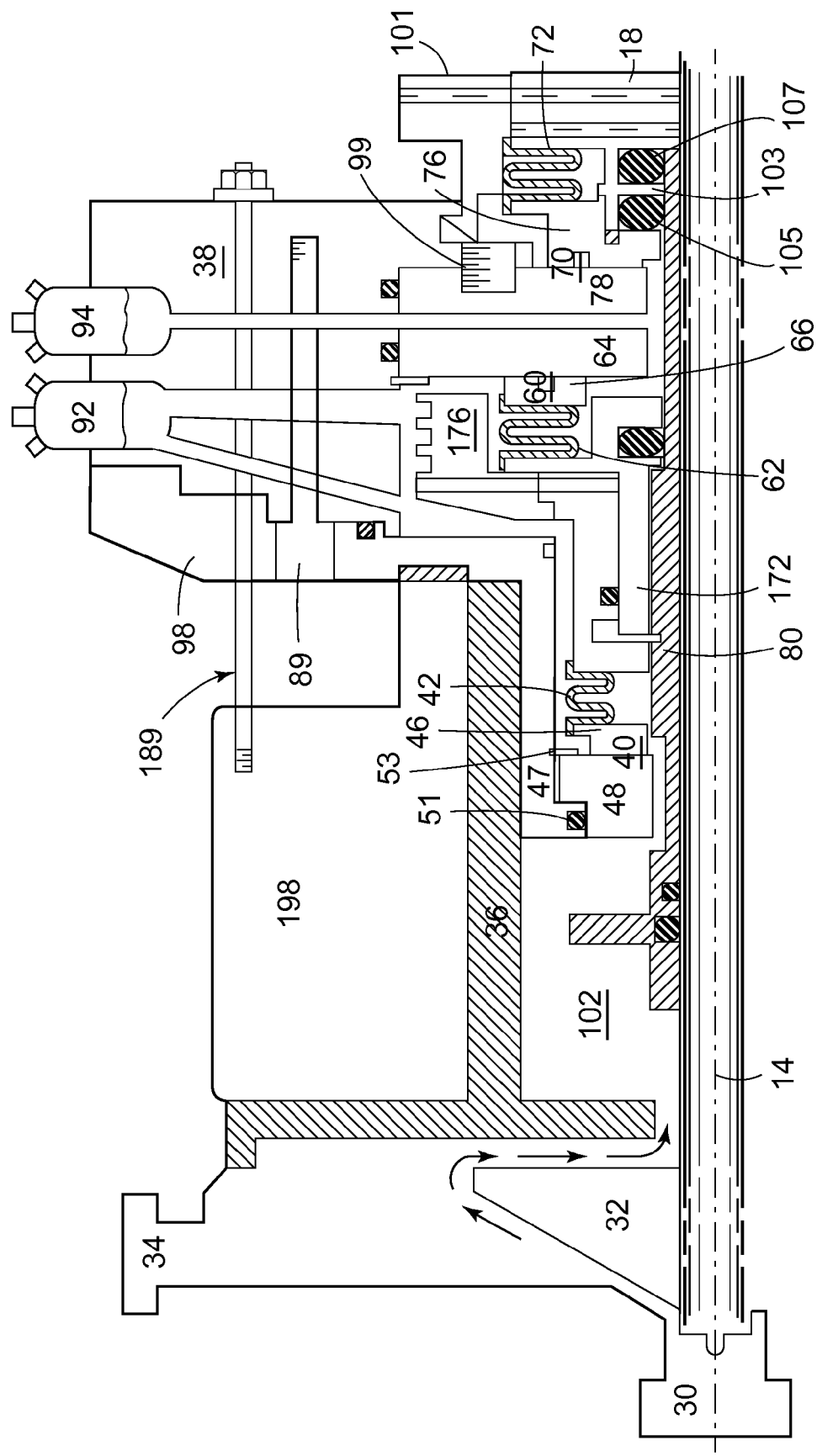
FIG. 1 depicts a three-seal mechanical seal system according to the invention.

The mechanical seal systems of the invention comprise three, four, five, or more mechanical seals installed around a rotating shaft. A "mechanical seal" as used herein means a seal having a rotating sealing face, a stationary sealing face and a loading mechanism including, but not limited to, a spring, coil or bellows maintaining the sealing faces compressed against each other. In the case where a gas barrier is used, some small separation between the seal faces may be maintained by the gas barrier, as described below. The systems may be used with pumps (centrifugal and positive displacement), compressors, mixers, and agitators, or any number of rotating equipment types with a rotating shaft—all of which are characterized by a process fluid contained within a housing under pressure. As used herein, "upstream" is the direction toward the higher pressure pressure in the housing and "downstream" is the opposite direction along the shaft away from the housing.

The mechanical seal systems of the invention may be installed as a cartridge system or as a component system. As used herein, a "component system" means that individual mechanical seals are mounted inside or outside a seal chamber provided with the equipment, as specified by the design. A "cartridge system" means that the mechanical seals of the system are preinstalled with mounting hardware, including a sleeve and gland plate which are mounted to the shaft. In this way the axial alignment of the seals in the system is ensured upon installation. Each mechanical seal according to the present invention closes off the respective portion of the seal chamber, and a pressure reducing flow path between upstream and downstream seals is not provided.

The space in which mechanical seals are provided is referred to as the "stuffing box" or "seal chamber," which is the area surrounding the shaft between the motor and the pump's volute housing. The seal chamber is defined by the volute pump housing at one end, a seal chamber wall bolted to and extending from the pump housing, and a seal gland at the opposite end, where the shaft enters the seal chamber. As used herein, "inboard" means inside the seal gland or in a direction toward the pump housing, and "outboard" means outside the seal gland or in a direction away from the pump housing toward the atmosphere and motor. The "outboard" mechanical seal of the invention is integrated with the gland plate.

In practice, the ability to modify or re-design the seal chamber space is quite limited. In preferred embodiments, seal systems according to the invention are compatible with International Organization for Standardization ("ISO") pump standards, Deutsches Institut für Normung ("DIN") pump standards, American National Standards Institute ("ANSI") pump standards and/or American Petroleum Institute ("API") pump standards. These standards typically specify the size, position, and distance above the ground of a pump flange, pump foot print, the distance above the ground of the shaft, and the length of the shaft from the motor gear box to the housing. These standards are provided so that equipment from different manufacturers may be integrated with existing piping and floor plans. As the pump size increases, the standard specifications change also. API standards, directed to more demanding applications, may add to the ANSI specifications: requiring a thicker shaft, or bearing isolation in place of a radial seal. ANSI standards are relevant herein because the person of ordinary skill in the art recognizes the limited space available to install three, four, five or more seals in a seal chamber of specified ANSI pump dimensions. Reference herein to ANSI or API specifications or any individual ANSI or API specification refers to the specification in current use on the filing date hereof.

A "process fluid" is the fluid being pumped, mixed or compressed by the rotating shaft's impeller, propeller, mixing blade, wheels, buckets, or other pieces of equipment, which may be a liquid, gas or slurry at the process temperature. A "barrier fluid" is a circulating fluid different from the process fluid, inert or less toxic and damaging to people, environment and the equipment than the process fluid, which is also provided to lubricate the non-process seal faces (i.e. all seal faces downstream of the first seal face contacting the process fluid.) Barrier fluid is typically maintained at a pressure greater than the process fluid to impede migration of process fluid past the seal faces and may be gas or liquid. In a very few cases, the barrier fluid or gas is at a lower pressure then the process fluid—usually in instances where barrier fluid contamination of the process fluid is unacceptable for various reasons.

A triple mechanical seal system according to the invention for a centrifugal ANSI pump housing is depicted in FIG. 1. Many commercially available centrifugal pumps meet this description and their construction and operation will not be described except as it impacts the mechanical seal system. In a centrifugal pump, an upstream process fluid enters pump housing at axial inlet 30, is compressed by impeller 32, and is expelled from the pump housing at a radial outlet port 34. Arrows depict the flow of pressurized process fluid around the impeller in the direction of the seal system—to be impeded by the seal system. The purpose of the seal system is to contain the process fluid within a seal chamber 102, defined by seal chamber wall 36 extending from the face of the housing to the gland plate 38, which is bolted to the seal chamber wall with bolts and sealed with O-rings, gaskets or other secondary sealing elements. One of ordinary skill in the art will appreciate that the size of the seal chamber in an ANSI pump is limited because the length of the shaft from the motor to the pump housing is set by standard. An adapter plate 198 is provided inboard of the gland plate 38 and secured with bolt 189. Gland adapter 98 is attached to the gland 38 with bolt 89.

First mechanical seal 40 constitutes a first rotating seal face 46 biased against first stationary seal face 48 by bias element 42 such as a bellows or spring. The first mechanical seal 40 is sometimes referred to as the first inboard upstream mechanical seal because it is inboard of the seal gland. Stationary face 48 is secured to the housing with adapter 47 behind snap ring 53. Thus, a process fluid flow path is not provided around the first mechanical seal, as in a pressure staged system. Process fluid that migrates beyond the first mechanical seal encounters second inboard mechanical seal 60, which is in a staggered arrangement with respect to the first mechanical seal, having a larger diameter than the first mechanical seal. Preferably, the second and third biasing elements have the same inside and outside diameter, and the same length in the axial direction. Likewise, mechanical seals upstream of the second mechanical seal (one, two or three seals) preferably all have the same inside and outside diameter and the same length in the axial direction. This is referred to as a "staggered" arrangement.

A second inboard mechanical seal 60 comprises a rotating face 66, stationary face 64, and a biasing element 62. A third mechanical seal 70, sometimes referred to as the outboard mechanical seal because it is positioned outboard of the gland plate 38, comprises a third (or outboard) rotating face 76, a third (or outboard) stationary face 78 and a third (or outboard) bias member 72. The third stationary face 78 is a "dual duty" sealing face, in that opposite sides of element 78 serve as stationary sealing faces for two different mechanical seals. In the embodiment depicted, in the case where a liquid barrier fluid is used, a pumping ring 176 is optionally provided which uses the centrifugal force generated by the rotating sealing face to circulate the liquid barrier fluid back to the source, as described in greater detail below. Second biasing member 62 and first biasing member 42 are optionally in back-to-back relationship. Thus, in the three-seal embodiment, the inside diameter of the first mechanical seal 40 runs in the process fluid and the outside diameter operates in a pressurized or non-pressurized barrier fluid or gas from circulating holding tank reservoir 92 or gas injection panel. The outside diameter of the second mechanical seal 60 also operates in the same circulating barrier fluid or barrier gas from a gas injection panel. The inside diameter of the second mechanical seal 60 may operate in a second barrier fluid or gas again maintained at a pressure lower or higher than the process fluid. The inside diameter of outboard mechanical seal 70 operates in the second circulating barrier fluid or gas from a separate gas injection panel. This configuration provides a back up mechanical seal and third protection mechanical seal so that when leakage occurs past the first mechanical seal 40, and the barrier fluid is lost through that seal, the second mechanical seal continues to be lubricated by second barrier fluid providing further protection from hazardous or abrasive pumped fluids from leaking into the atmosphere or into the process fluid.

Figure 2:
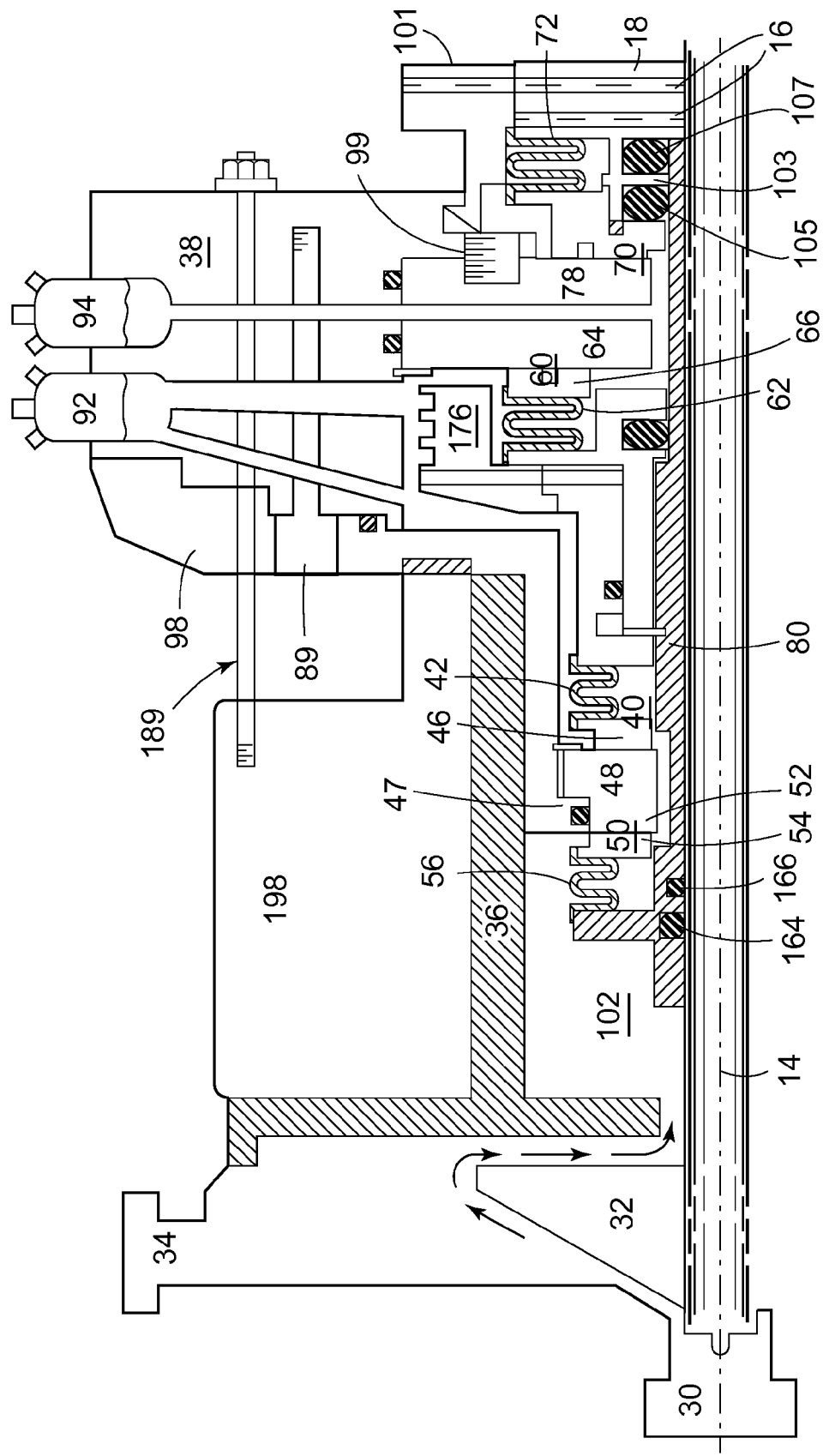
FIG. 2 depicts a four-seal mechanical seal system according to the invention.

In an embodiment depicted in FIG. 2, a fourth mechanical seal 50 may be added upstream of the first mechanical seal 40, including a dual duty or fourth stationary sealing face 52 (on the opposite side of the first stationary seal face 48) and fourth rotating sealing face 54. The fourth biasing member is located between a radial extension of the sleeve 80 and the fourth rotating sealing face. In operation, the fourth mechanical seal operates only in the process fluid. The downstream mechanical seals may be lubricated by another source of barrier fluid, as described above. An optional drill through port can be added so that the fourth seal can also be lubricated by a barrier fluid or gas in addition to the process fluid.

Figure 3:
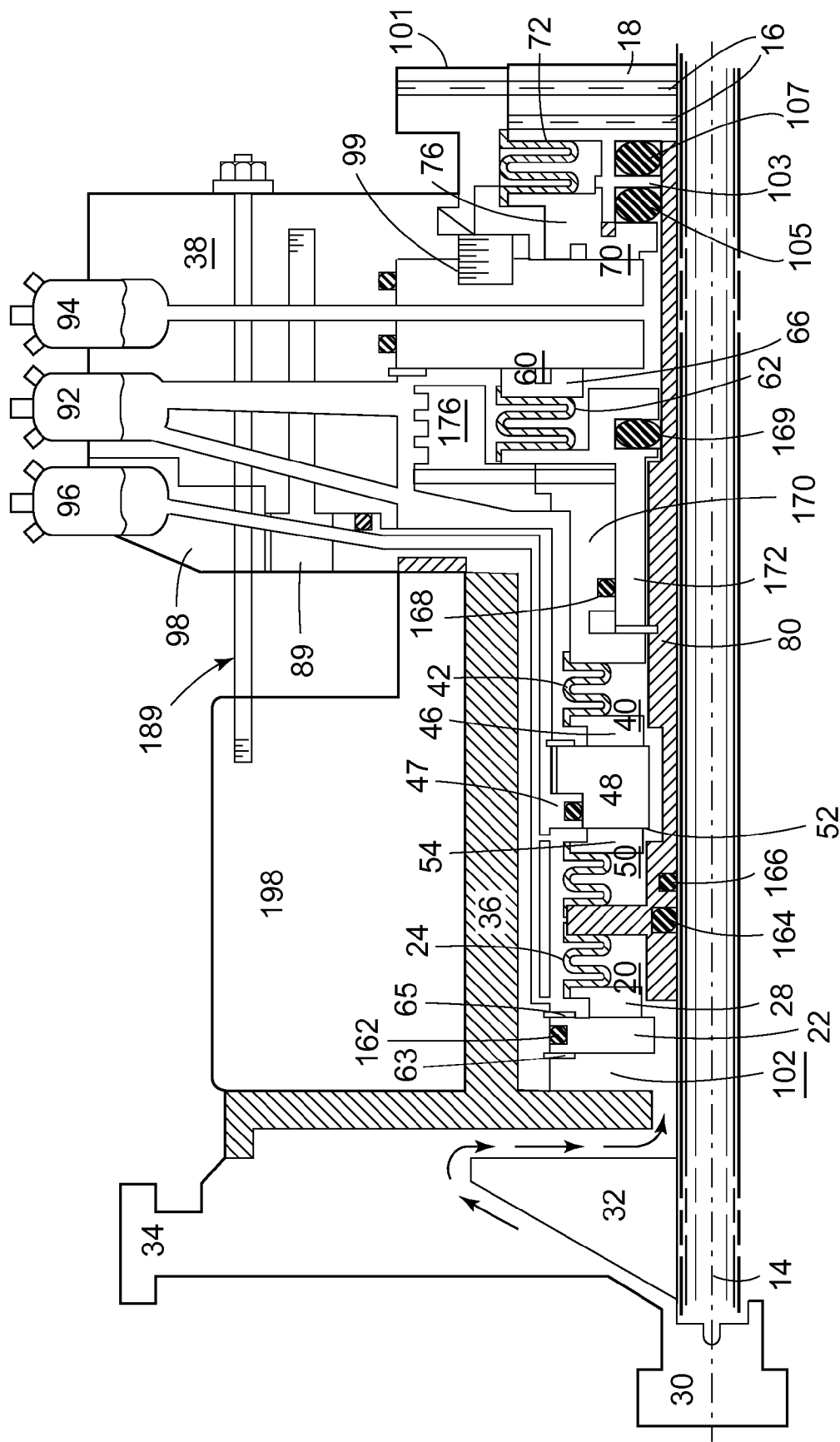
FIG. 3 depicts a five-seal mechanical seal cartridge system according to the invention.

In an embodiment depicted in FIG. 3, a fifth mechanical seal 20 is added upstream of the fourth mechanical seal 50. In this embodiment, the fifth mechanical seal would be the first seal contacted by process fluid entering the seal chamber 102. Fifth stationary seal face 22 is held in place between a pair of snap rings 63, 65 and bellows 24 biases rotating face 28 against stationary face 22. The sealing faces of each of the seals 20, 40, 50, 60, and 70 are preferably made of silicon carbide or tungsten carbide or other suitable materials known in the art.

The present invention utilizes multiple mechanical seals within the limited space of the seal chamber as described above by utilizing seals having shorter overall length. The inventors have recognized that the sealing faces of individual seals do not need to be compressed so tightly to prevent leakage in an ordinary duty pump. For example, a pump rated for a given pressure will operate most of the time well below the rated pressure. Rather than using one or two seals rated at the rated pressure of the pump, as in the prior art, longer life and a greater efficiency preventing leakage is achieved with more seals having a lower maximum pressure rating. Such seals have shorter overall length and thus more of them can be used.

In the case where bellows are used as the biasing members for the mechanical seals, it is preferred that all of the bellows have the same length. To be operable with the three-, four-, five- or more seal systems of the invention, and fit within standard seal chambers, the bellows should have at least one convolution and have a length in a range of about 0.2 inches to about 0.3 inches. A presently preferred configuration utilizes asymmetric non-welded bellows having three convolutions and a length of about 0.280 inches. Welded bellows may be used, especially if a specific design requires specialty materials such as 316 stainless steel, Hastelloy C or other. Welded members may be shorter, having a larger number of convolutions. If other loading members are utilized, such as a spring, the artisan having ordinary skill can arrive at an appropriate length such that two to four or more seals fit in the seal chamber and still provide the appropriate compression on each seal face relative to the size of the shaft and the pressure rating of the pump.

In the three-seal system depicted in FIG. 1, two of the seals are inboard of the seal gland with an additional third seal outboard of the seal gland. In a four-seal system, three seals are inboard of the seal gland with an additional fourth seal outboard of the seal gland. And in a five-seal system, four seals are inboard of the seal gland with an additional fifth seal outboard of the seal gland. None of these configurations has been practiced in the prior art. Further, the seals are in a staggered arrangement, so that the seals on either side of the seal gland have a larger diameter than the one, two or three seals further inboard of the seal gland.

In a five-seal arrangement, the first three seals encountered downstream of the pump housing have the same diameter and the two seals arranged on opposite sides of the seal gland plate have the same diameter. In an exemplary five-seal embodiment, utilizing a 1.375 inch shaft, the three inboard seals have a bellows with a 1.510 inch inside diameter and the two seals arranged on opposite sides of the seal gland have inside diameter of 1.688 in. The sizing of the biasing members for the pumps is explored in Tables 1 and 2 below. In the preferred examples, all of the seals biasing members have the same bellows length.

Figure 4:
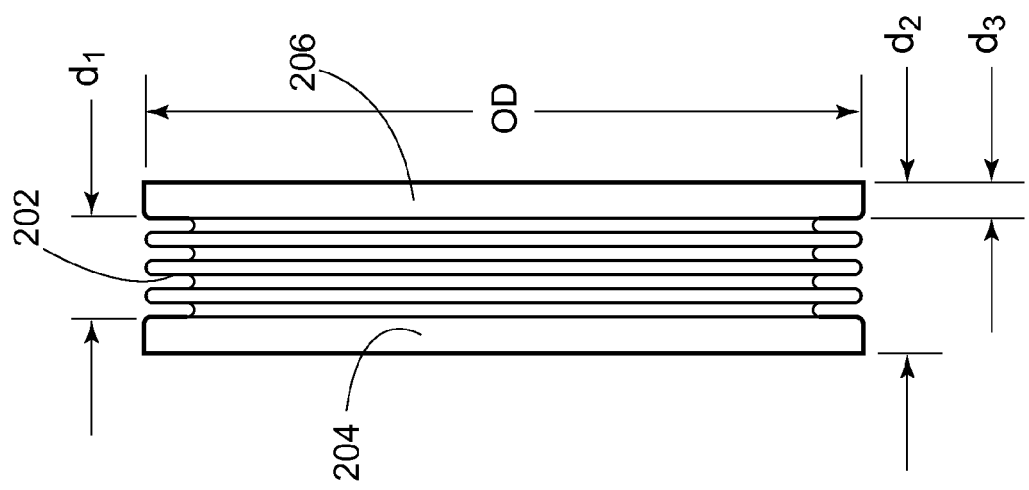
FIG. 4 depicts bellows for use with a mechanical seal according to the invention.

FIG. 4 depicts the convention used in this application for measuring the length of a bellows seal. The bellows 202 is positioned between the seal ring shells 204, 206, such that the length of the bellows refers to the distance "$d_1$" between the seal ring shells. The length of the entire bellows assembly including the seal ring shells 204, 206 is "$d_2$", and the length of the seal ring shell 206 is referred to as "$d_3$". The construction of a bellows seal is known in the art. A less preferred bellows design, used with certain cartridge seals known in the art, comprises a plurality of rings welded together to make the convolutions (as opposed to being electroformed). In a preferred embodiment of the invention, the bellows are electroformed, made of gold plated electrodeposited nickel. Other chemically resistant materials are known in the art and may be used.

The following Tables 1 and 2 identify the dimensions of representative bellows used in connection with preferred embodiment of the invention according to shaft size of an ANSI pump. In each case all five seals have the same length. For a given shaft size, the three inboard seals have the same diameter and the two seals on opposite sides of the seal gland have the same diameter.

TABLE 1

| Shaft Size | Seals 20, 50, 40 | Bellows Length Inboard | Seals 60 & 70 | Bellows Length Outboard |
|---|---|---|---|---|
| 1.125 | 1.385 | 0.28 | 1.563 | 0.28 |
| 1.125 | 1.385 | 0.28 | 1.563 | 0.28 |
| 1.375 | 1.51 | 0.28 | 1.688 | 0.28 |
| 1.437 | 1.572 | 0.28 | 1.751 | 0.28 |
| 1.625 | 1.76 | 0.28 | 1.938 | 0.28 |
| 1.75 | 1.885 | 0.28 | 2.063 | 0.28 |
| 1.875 | 2.01 | 0.28 | 2.188 | 0.28 |
| 2.125 | 2.26 | 0.28 | 2.438 | 0.28 |
| 2.437 | 2.572 | 0.28 | 2.751 | 0.28 |
| 2.5 | 2.635 | 0.28 | 2.813 | 0.28 |
| 2.625 | 2.76 | 0.28 | 2.938 | 0.28 |
| 2.75 | 2.885 | 0.28 | 3.063 | 0.28 |
| 3.44 | 3.572 | 0.28 | 3.751 | 0.28 |
| 4.5 | 4.635 | 0.28 | 4.813 | 0.28 |
| 1.375 | 1.885 | 0.28 | 2.188 | 0.28 |
| 1.75 | 2.26 | 0.28 | 2.438 | 0.28 |
| 1.875 | 2.572 | 0.28 | 2.751 | 0.28 |
| 2.125 | 2.635 | 0.28 | 2.813 | 0.28 |
| 2.5 | 2.635 | 0.28 | 2.813 | 0.28 |
| 2.625 | 2.885 | 0.28 | 3.063 | 0.28 |
| 2.75 | 3.572 | 0.28 | 3.751 | 0.28 |
| 1.063 | 1.385 | 0.28 | 1.563 | 0.28 |
| 1.188 | 1.51 | 0.28 | 1.688 | 0.28 |
| 1.313 | 2.635 | 0.28 | 1.813 | 0.28 |
| 1.438 | 1.76 | 0.28 | 1.938 | 0.28 |
| 1.563 | 1.885 | 0.28 | 2.063 | 0.28 |
| 1.688 | 2.01 | 0.28 | 2.188 | 0.28 |
| 1.813 | 2.26 | 0.28 | 2.438 | 0.28 |
| 1.938 | 2.26 | 0.28 | 2.438 | 0.28 |

TABLE 2

| Shaft Size | Seals 20, 50, 40 | Bellows Length Inboard | Seals 60 & 70 | Bellows Length Outboard |
|---|---|---|---|---|
| 2.063 | 2.572 | 0.28 | 2.251 | 0.28 |
| 2.188 | 2.572 | 0.28 | 2.251 | 0.28 |
| 2.438 | 2.76 | 0.28 | 2.938 | 0.28 |
| 2.563 | 2.885 | 0.28 | 3.063 | 0.28 |
| 2.688 | 3.01 | 0.28 | 3.188 | 0.28 |
| 2.813 | 3.135 | 0.28 | 3.313 | 0.28 |
| 2.938 | 3.26 | 0.28 | 3.438 | 0.28 |
| 3.063 | 3.385 | 0.28 | 3.563 | 0.28 |
| 3.188 | 3.51 | 0.28 | 3.688 | 0.28 |
| 3.313 | 3.635 | 0.28 | 3.813 | 0.28 |
| 3.438 | 3.76 | 0.28 | 3.938 | 0.28 |
| 3.563 | 3.885 | 0.28 | 4.063 | 0.28 |
| 3.688 | 4.01 | 0.28 | 4.188 | 0.28 |
| 3.813 | 4.135 | 0.28 | 4.313 | 0.28 |
| 3.938 | 4.26 | 0.28 | 4.438 | 0.28 |
| 4.063 | 4.385 | 0.28 | 4.563 | 0.28 |
| 4.188 | 4.51 | 0.28 | 4.688 | 0.28 |
| 4.313 | 4.635 | 0.28 | 4.813 | 0.28 |
| 4.438 | 4.76 | 0.28 | 4.938 | 0.28 |
| 4.563 | 4.885 | 0.28 | 5.063 | 0.28 |
| 4.688 | 5.01 | 0.28 | 5.188 | 0.28 |
| 4.813 | 5.135 | 0.28 | 5.313 | 0.28 |

The seal systems depicted in FIG. 1 through FIG. 3, are cartridge seal systems in which the mechanical seals 20, 40, 50, 60, and 70 are provided in a fixed position on a sleeve 80. Sleeve 80 is attached to the shaft 14 via set screw 16 and drive collar 18. In another aspect of the invention, drive collar 18 utilizes a cross drive 103 which provides double protection inside diameter O-rings 105, 107 before the atmosphere. As a practical necessity, first O-ring 162, is an outside diameter (OD) O-ring. However, according to the invention, it is preferred to utilize inside diameter (ID) O-rings, i.e., O-rings which are provided in a radially inward facing groove machined into the equipment. Thus, O-rings 164 and 166, providing ID seals between the sleeve 80 and the shaft 14. Likewise, ID O-ring 168 provides a seal between pumping ring adapter 170 and seal adapter 172 to prevent migration of barrier fluid or barrier gas. Another ID O-ring 169 is provided between the seal adapter and the sleeve. O-rings are made of polytetrafluoroethylene or other chemically resistant material. To reduce inventory and simplify installation, the same sleeve 80 is provided for three, four and five seal systems, providing predetermined axial positions to place the sealing faces and biasing members. The cartridge is provided with the tension of the biasing members pre-set with clip spacers 101. To install the cartridge, the mechanic lubricates the sleeve O-ring and slides it over the shaft, tightens the seal chamber bolts setting the seal gland in place, tightens the seal drive collar mechanism to the shaft in order to drive the seal and removes the cartridge clip spacers so that the seals and sleeve can spin with the shaft.

The prior art does not teach a mechanical seal system in which two different barrier fluid sources may be used at the same time. According to the invention, a plurality of barrier fluids may be used. In one embodiment, the invention encompasses a low-pressure, light duty multi-seal cartridge operating with both a liquid and a gas barrier at the same time.

An exemplary barrier fluid flow scheme for a five seal system is depicted in FIG. 3. A first barrier fluid source 92 provides circulating barrier fluid to the first and second seal faces 40 and 60; while a second barrier fluid source 94 provides circulating barrier fluid to the second seal face 60 and third seal face 70. A third barrier fluid source 96 provides circulating barrier fluid to the fourth and fifth seal faces 50 and 20. With the scheme according to the invention, the barrier fluids employed do not have to be the same fluid or maintained at the same pressure. In contrast, the double seal systems known in the art comprise a single chamber for barrier fluid between the seals, and only a single barrier fluid or gas may be used.

Figure 5:
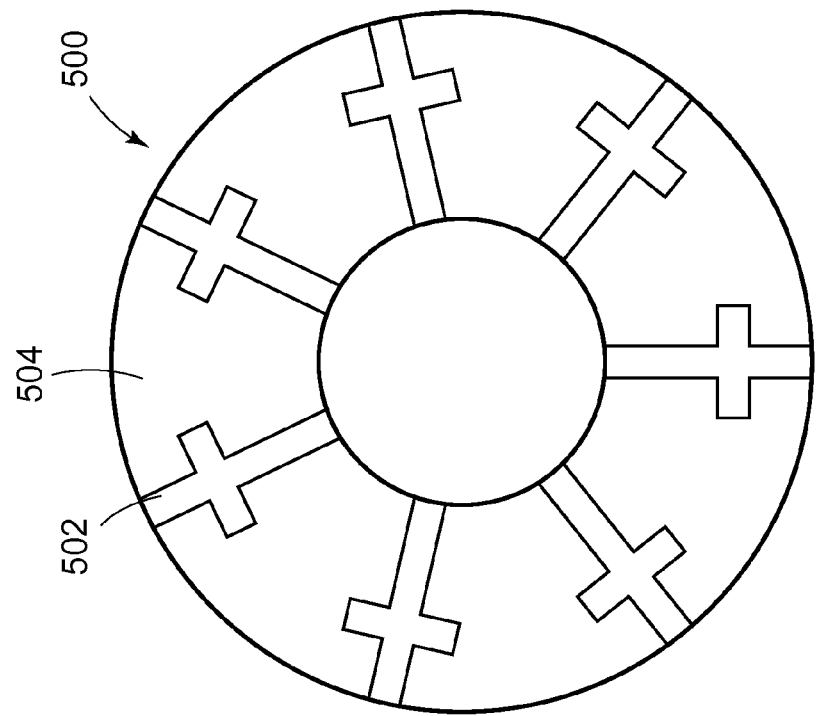
FIG. 5 depicts a seal face according to an embodiment of the invention employing a bidirectional cross groove design.

In another aspect, the invention is directed to a seal having a bi-directional cross groove design as shown in FIG. 5. In this embodiment, rotating seal 500 includes grooves 502 in polished face 504. With the prior art spiral grooves, the face is adapted for rotation in one direction only to accommodate flow of gas in the grooves. The grooves according to this embodiment are bi-directional, in the sense that the grooves will operate identically regardless of the direction of rotation.

The above description of the preferred embodiments is not to be deemed to limit the invention, which is defined by the following claims.

The invention claimed is:

1. A mechanical seal system for containing a fluid in rotary shaft equipment having a stationary housing and a rotating shaft therein and having upstream and downstream directions along an axis of the shaft, comprising:
    a first rotating seal face, a first stationary seal face, and a first biasing member urging the first rotating seal face toward the first stationary seal face;
    a second rotating seal face downstream of the first rotating seal face, a second stationary seal face, and a second biasing member urging the second rotating seal face toward the second stationary seal face;
    a seal chamber surrounding the rotating shaft having an opening at an upstream end thereof where the rotating shaft enters the stationary housing, a seal gland forming an axial end wall of the seal chamber opposite the opening at the upstream end, and an opening in the seal gland through which the rotating shaft passes;
    a third rotating seal face downstream of the first and second rotating seal faces, a third stationary seal face, and a third biasing member urging the third rotating seal face toward the third stationary seal face, the third rotating seal face, third stationary seal face, and third biasing member being located outboard of and integrated with the seal gland.

2. The mechanical seal system according to claim 1, further comprising
    a fourth rotating seal face upstream of the first and second rotating seal faces, a fourth stationary seal face, and a fourth biasing member urging the fourth rotating seal face toward the fourth stationary seal face, the fourth rotating seal face, fourth stationary seal face, and fourth biasing member being within the seal chamber.

3. The mechanical seal system according to claim 2, further comprising
    a fifth rotating seal face upstream of the fourth rotating seal face, a fifth stationary seal face, and a fifth biasing member urging the fifth rotating seal face toward the fifth stationary seal face, the fifth rotating seal face, fifth stationary seal face, and fifth biasing member being within the seal chamber.

4. The mechanical seal system according to claim 3, further comprising a sleeve having the first, second, third, fourth and fifth rotating and stationary seal faces mounted thereon, and a drive collar adapted to attach the sleeve to the shaft with a set screw, wherein
    the sleeve is attached to the seal gland by clip spacers so that the sleeve is installed over the shaft and the seal gland is attached to the seal chamber with the first, second, third, fourth and fifth stationary seal faces and associated rotating seal faces and biasing members being positioned in predetermined axial spacing on the shaft upon installation.

5. The mechanical seal system according to claim 4, wherein the second biasing member and the third biasing member each comprises metal bellows having the same diameter; and wherein the first biasing member, the fourth biasing member and the fifth biasing member each comprises metal bellows having the same diameter, which is smaller than the diameter of the second and third biasing members.

6. The mechanical seal system according to claim 3, further comprising
    a first barrier fluid source providing barrier fluid between the first and/or second stationary and rotating seal faces; and
    a second barrier fluid source providing barrier fluid between the first, second and/or third rotating and stationary seal faces; and
    a third barrier fluid source providing barrier fluid between the fourth and fifth rotating and stationary seal faces.

7. The mechanical seal system of claim 6, wherein at least one of the first, second, third, fourth, or fifth rotating or stationary seal faces is provided with gas channels and the respective barrier fluid source is a source of gas under pressure.

8. The mechanical seal system according to claim 3, wherein the stationary housing is a centrifugal pump housing meeting ANSI specifications.

9. The mechanical seal system of claim 3, wherein the stationary housing is a mixer housing, the rotating shaft is connected to at least one mixing blade contacting process fluid in the mixer housing, and wherein
    process fluid pressure in the mixer housing is greater than the pressure in an area proximate the rotating shaft outside the mixer housing.

10. The mechanical seal system according to claim 2, further comprising a sleeve having the first, second, third and fourth rotating and stationary seal faces mounted thereon, and a drive collar adapted to attach the sleeve to the shaft with a set screw, wherein
    the sleeve is attached to the seal gland by clip spacers so that the sleeve is installed over the shaft and the seal gland is attached to the seal chamber with the first, second, third and fourth stationary seal faces and associated rotating seal faces and biasing members being positioned in predetermined axial spacing on the shaft upon installation.

11. The mechanical seal system according to claim 10, wherein
    the second biasing member and the third biasing member each comprises metal bellows having the same diameter; and wherein the first biasing member and the fourth biasing member each comprises metal bellows having the same diameter, which is smaller than the diameter of the second and third biasing members.

12. The mechanical seal system according to claim 2, wherein the stationary housing is a centrifugal pump meeting ANSI specifications.

13. The mechanical seal system of claim 2, wherein the stationary housing is a mixer housing, the rotating shaft is connected to at least one mixing blade contacting process fluid in the mixer housing, and wherein
    process fluid pressure in the mixer housing is greater than a pressure in an area proximate the rotating shaft outside the mixer housing.

14. The mechanical seal system according to claim 1, further comprising a sleeve having the first, second and third rotating and stationary seal faces mounted thereon, and a drive collar adapted to attach the sleeve to the shaft via a set screw, wherein
    the sleeve is attached to the seal gland by clip spacers so that the sleeve is installed over the shaft and the seal gland is attached to the seal chamber with the first, second and third stationary seal faces and associated rotating seal faces and biasing members being positioned in predetermined axial spacing on the shaft upon installation.

15. The mechanical seal system according to claim 14, wherein the second biasing member and the third biasing member each comprises metal bellows having the same diameter, and wherein the first biasing member comprises metal bellows having a smaller diameter than the diameter of the second and third biasing members.

16. The mechanical seal system according to claim 1, further comprising
- a first barrier fluid source providing barrier fluid between the first and second rotating and stationary seal faces; and
- a second barrier fluid source providing barrier fluid between the second rotating and stationary seal faces and/or between the third rotating and stationary seal faces.

17. The mechanical seal system according to claim 16, wherein at least one of the first, second or third rotating or stationary seal faces is provided with gas channels and the respective barrier fluid source is a source of gas under pressure.

18. The mechanical seal system according to claim 1, wherein the stationary housing is a centrifugal pump meeting ANSI specifications.

19. The mechanical seal system according to claim 1, wherein at least one seal face is provided with gas channels.

20. The mechanical seal system according to claim 1, wherein at least one seal face is provided with bi-directional cross groove channels.

\* \* \* \* \*